C. R. BOLD.
CONVERTLET.
APPLICATION FILED APR. 10, 1909.
932,433.
Patented Aug. 31, 1909.
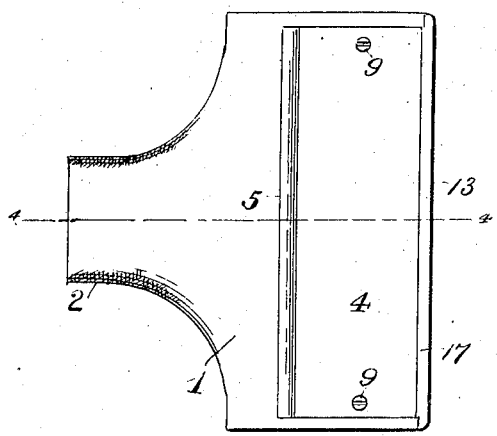
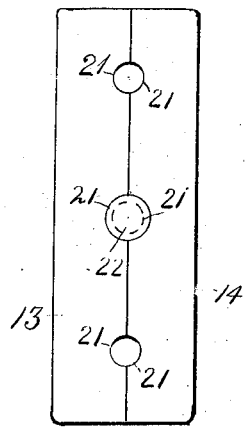
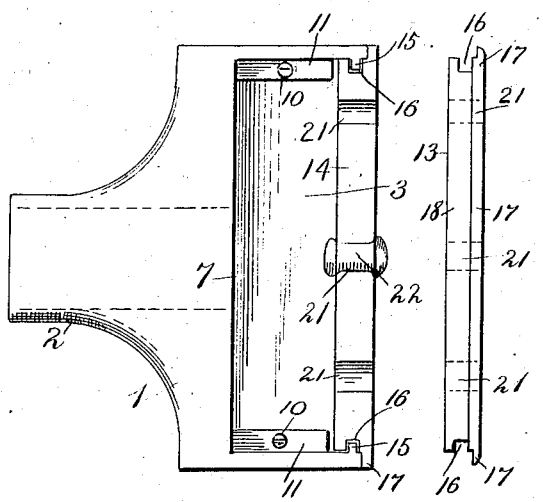
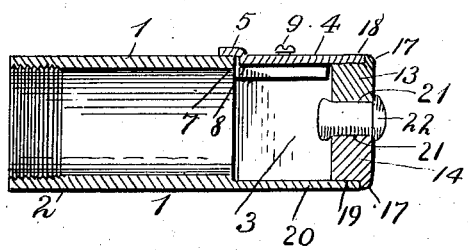
Witnesses
J. L. Durand
W. Parker Reinohl
Inventor
Cecil R. Bold.
By D. C. Reinohl
Attorney

UNITED STATES PATENT OFFICE.

CECIL R. BOLD, OF CHARLESTON, SOUTH CAROLINA.

CONVERTLET.

932,433.  Specification of Letters Patent.  Patented Aug. 31, 1909.

Application filed April 10, 1909. Serial No. 489,076.

*To all whom it may concern:*

Be it known that I, CECIL R. BOLD, a citizen of the United States, residing at Charleston, in the county of Charleston and State of South Carolina, have invented certain new and useful Improvements in Convertlets; and I do hereby declare the following to be a full, clear, and exact description of the invention, such as will enable others skilled in the art to which it appertains to make and use the same.

My invention relates to convertlets or what are known to the trade as outlet boxes for electrical conductors and has for its object economy in time in making electrical connections and avoiding the necessity for cutting the wire of a line in position.

The invention consists in certain improvements in construction, which will be fully disclosed in the following specification and claims.

In the accompanying drawings, which form part of this specification:—Figure 1 represents a top plan view of my improved device. Fig. 2 an end view of the same. Fig. 3 a plan view showing the cover and one of the end sections removed, and Fig. 4 a vertical longitudinal section on line 4—4, Fig. 1.

Reference being had to the drawings and the designating characters thereon, the numeral 1 indicates a box provided with an internally screw-threaded extension 2 which may be made to fit any standard piping used for conveying electric wires. The chamber 3 which is shown disposed at a right angle to the extension 2, and in which the joints of wires are made, is provided with a removable cover 4, having a lip 5 to cover the joint between the edge 7 of the box and the edge 8 on the cover to exclude water or other foreign matter; and the cover may be secured to the box, by screws 9, or in any other preferred manner. When screws are used, holes 10, are formed in lugs 11, on which the ends of the cover rest, and properly screw-threaded to receive the screws 9.

The outer end of the chamber 3 is provided with a two part closure, 13, 14, made of porcelain or other insulating material and detachably secured between the side walls of the box, by means of tongues 15, formed on the walls, and grooves 16, in the ends of the sections 13, 14 which engage said tongues, and beyond the groove is a flange 17, which covers the entire end of the box 1 or its chamber 3, and prevents water or other foreign matter entering the chamber. The closure sections are provided with recesses 18, 19, the latter engage the bottom wall 20, of the chamber 3, and the former to receive the cover 4, as shown in Fig. 4.

Each section 13, 14, is provided with a semicircular opening 21 opposite each other to form outlets for wires, and one of the outlets is shown closed by a plug 22 of rubber or the like.

The device as constructed is rain proof, the porcelain insulators 13, 14, can be inserted after the wires have been drawn through the box, and in the event that they should be broken by accident or otherwise they can be replaced without cutting or taking down the wiring.

It is obvious that modifications can be made in the device for allowing wires to be run at different angles without departing from the spirit of the invention.

Having thus fully disclosed my invention, what I claim is—

1. A device of the class described having detachable and separable end sections provided with flanges on its sides and ends to cover the end of the device and having openings through said end sections to form outlets for wires, and a detachable cover affording access to the interior of the device.

2. A device of the class described, having a chamber therein provided with a detachable cover, detachable and separable end sections of insulating material provided with semi-circular openings, a tongue and groove joint between the ends of said sections and the side walls of said chamber and a flange covering the joint.

In testimony whereof I affix my signature, in presence of two witnesses.

CECIL R. BOLD.

Witnesses:
T. A. BROOKBANKS,
G. E. HAZLEHURST, Jr.